No. 711,001. Patented Oct. 14, 1902.
C. M. RHODES.
HUB CLUTCH FOR BICYCLES.
(Application filed Nov. 6, 1901.)
(No Model.) 2 Sheets—Sheet 1.
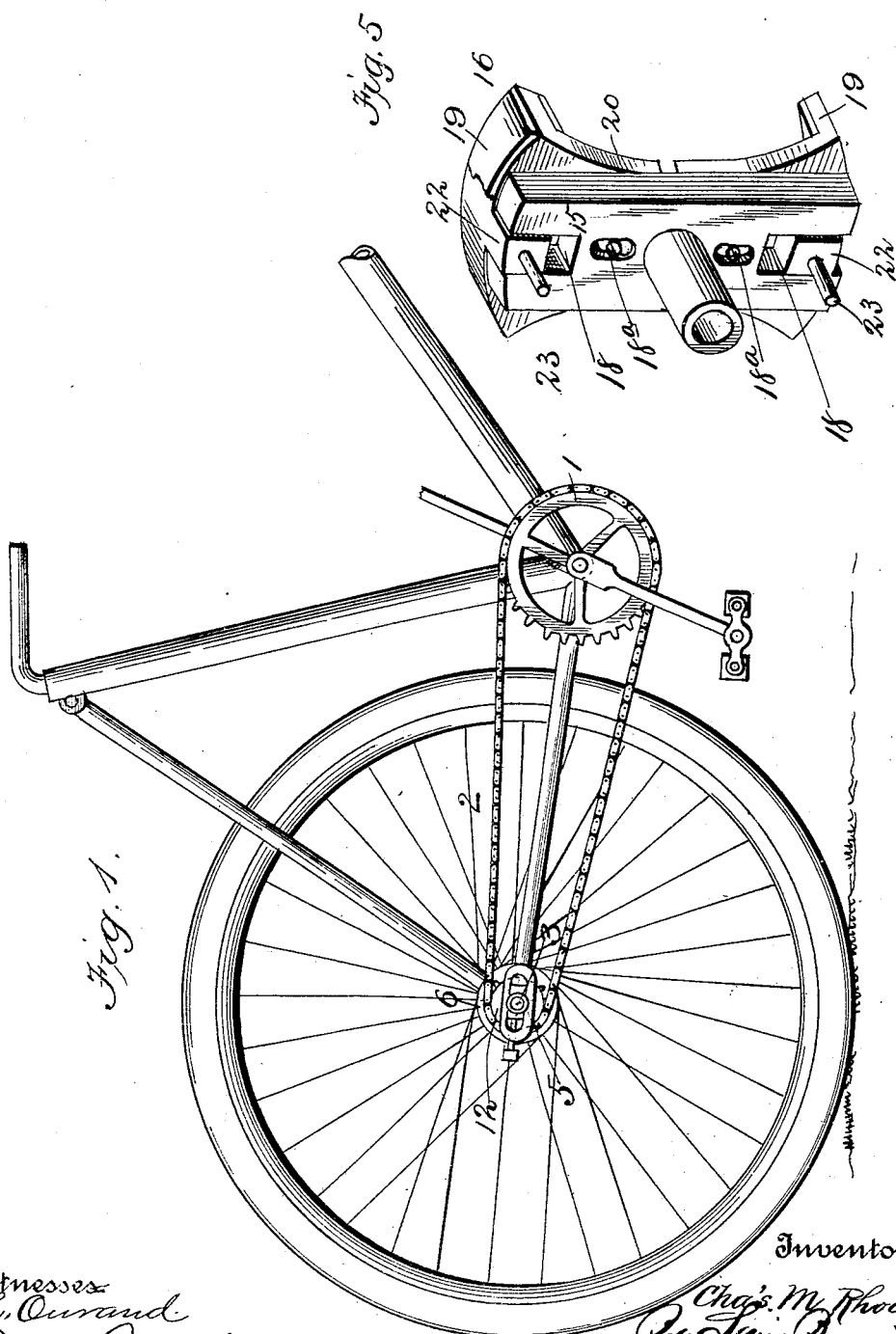

No. 711,001. Patented Oct. 14, 1902.
C. M. RHODES.
HUB CLUTCH FOR BICYCLES.
(Application filed Nov. 6, 1901.)
(No Model.) 2 Sheets—Sheet 2.
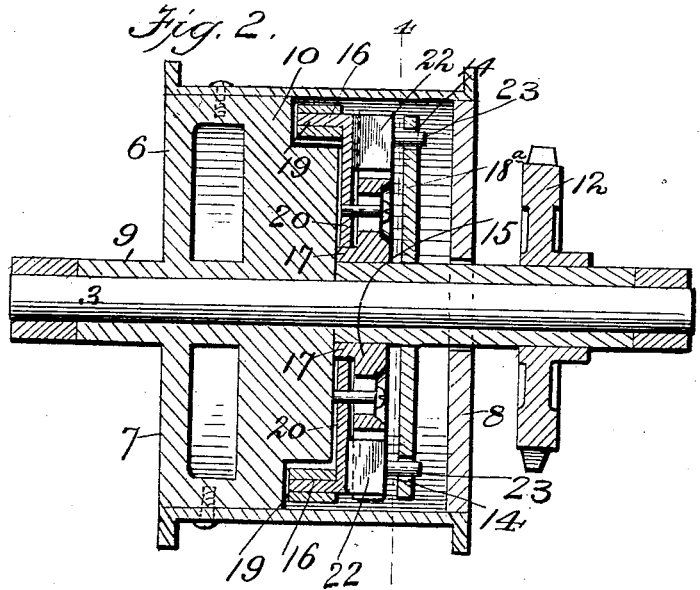
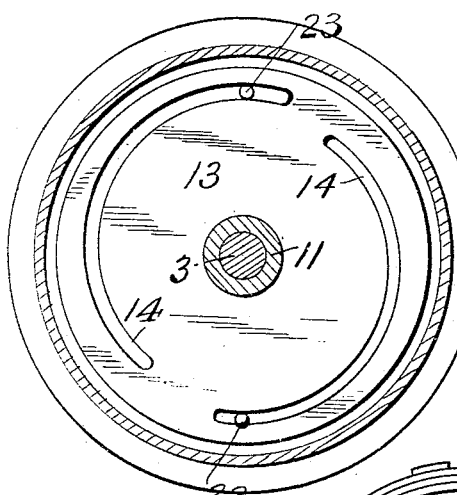
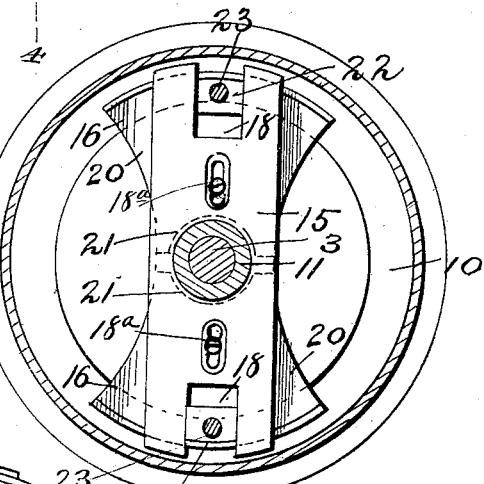
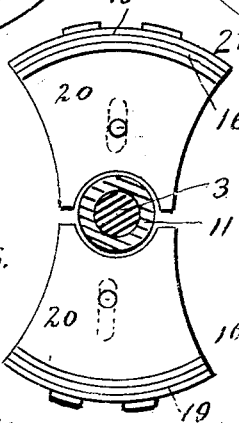
Witnesses:
F. L. Ourand
F. G. Radetfinger
Inventor:
Chas. M. Rhodes,
By Louis Bagger & Co.
Attorneys.

UNITED STATES PATENT OFFICE.

CHARLES M. RHODES, OF STEUBENVILLE, OHIO.

HUB-CLUTCH FOR BICYCLES.

SPECIFICATION forming part of Letters Patent No. 711,001, dated October 14, 1902.

Application filed November 6, 1901. Serial No. 81,337. (No model.)

*To all whom it may concern:*

Be it known that I, CHARLES M. RHODES, a citizen of the United States, residing at Steubenville, in the county of Jefferson and State of Ohio, have invented new and useful Improvements in Hub-Clutches, of which the following is a specification.

My invention relates to hub-clutches for bicycles, and pertains to the class which are operated by back pedaling to brake and by forward pedaling to clutch and drive the machine.

The object of my invention is to produce a device of this character which will combine the several advantages of simplicity, durability, and efficiency.

In my improved clutch the number of wearing parts are reduced to a minimum and the wearing parts completely protected from dirt. The power is also applied at the center of the hub between the forks and a better balance obtained.

My improved clutch is designed to be secured to the axle of the rear wheel.

The advantages above set forth are secured by a novel construction to be herein fully described and claimed.

In the drawings which accompany this specification and of which they form a part, Figure 1 is a side elevation of a portion of a bicycle with my clutch attached thereto. Fig. 2 is a transverse section through the hub of the rear wheel of the bicycle. Fig. 3 is a side elevation of my clutch on the line 3 3, Fig. 2. Fig. 4 is a section on the line 4 4, Fig. 2. Fig. 5 is a detail perspective of the shoes and guide-bar. Fig. 6 is a front elevation of the same.

Like numerals of reference denote like parts wherever they occur in these drawings.

The numeral 1 designates the large sprocket-wheel on a bicycle, and 2 the chain. A shaft 3 supports the rear wheel 4 and is secured in the frame at 5. The hub 6 of the rear wheel is enlarged, and thereby adapted to house the essential mechanism of my improved clutch. The heads of the hub are designated by the numerals 7 and 8. Mounted to rotate on the shaft 3 is a sleeve 9, and formed integral with this sleeve is a clutch-wheel 10 and the head 7. The clutch-wheel 10 has a broad convex face designed to be engaged by the clutch-shoes and is rigidly connected to the hub 6. Abutting the end of the sleeve 9 is a second sleeve 11, mounted to revolve on the shaft 3, and keyed thereon is a small sprocket-wheel 12 and a cam-wheel 13. The sprocket 12 is situated outside the head 8, which is not connected to the sleeve 11, and lines up with the main sprocket 1, as is usual. The cam-wheel 13 is cut by two eccentric or spiral slots 14, which are designed to operate the clutch mechanism to lock it when the wheel is revolved in one direction and to unlock it when revolved in the other direction. This clutch mechanism consists of the combination of a guide-bar 15 and two segmental clutch-shoes 16. The guide-bar is provided with a projecting hub 17 and guide-slots 18 and 18$^a$ and fits loosely the sleeve 11 intermediate the wheels 10 and 13. The shoes 15 have flanges 19 formed integral therewith, adapted to fit the rim of the brake-wheel 10, and plates 20 cut out at 21 to fit the hub 17. Guide-lugs 22, which fit the slots 18, are formed on the back of the shoes 16, and seated in these lugs are pins 23, adapted to fit and project through the slots 14 in the cam-wheel. The combination of the shoes 16 and the guide-bar 15 forms a friction-clutch operated by the wheel 13 to engage the wheel 10, since the slots 14 are set to throw the pins 23.

The operation of my device can now be given and is as follows: When pressure is applied to the pedals, the motion is communicated to the small sprocket 12 by means of the sprocket 1 and chain 2. The sleeve 11 will be rotated on the axis 3 and will carry with it the cam-wheel 13, thereby moving the brake-shoes 16 and compelling them to grip the brake-wheel 10. This action will cause the hub 6 to rotate in unison with the sprocket 12, and thereby propel the bicycle. When it is desired to coast, the rider back-pedals. This motion will be communicated to the cam-wheel 13 through the connecting mechanism, when the pins 23 will be displaced outwardly from the center by the slots 14, the shoes 16 thrown out of contact with the clutch-wheel 10, and the rear wheel of the bicycle left free to spin independent of the propelling mechanism. To again bring the machine under control, the rider pedals forward, when the shoes will once more contact with the clutch-wheel and the bicycle be propelled. It should also be noted that in back-pedaling, as above described, to cause the shoes to release the clutch-wheel if the pedals are turned back farther the shoes will be thrown out by the action of the slots 14 and brought into engagement with the hub, thereby braking the wheel. As shown plainly in Fig. 2, both curved faces of the flanges 19 are shod to adapt them to grip either the clutch-wheel or the inner surface of the hub.

I do not wish to be limited as to details of construction, as these may be changed in many particulars without departing from the spirit of my invention.

Having thus described my invention, what I claim as new, and wish to secure by Letters Patent, is—

1. In a clutch mechanism, the combination of a shaft, a first sleeve mounted to revolve on said shaft, a clutch-wheel rigidly connected to said sleeve, a pair of clutch-shoes located to engage the periphery of said clutch-wheel and bearing pins, a cam-wheel mounted to revolve on said shaft and having eccentric slots therein engaging said pins on said shoes, and means for rotating said cam-wheel, substantially as described.

2. In a device of the class described, the combination with a hub, of a clutch-wheel located within said hub and mounted to revolve in unison therewith, of shoes mounted within said hub and located to engage said clutch-wheel and said hub, pins mounted in said shoes, a cam-wheel mounted to revolve independently of said hub and provided with eccentric slots located to engage said pins to operate said shoes, and means for rotating said cam-wheel, substantially as described.

3. In a clutch mechanism, the combination with a hub, of a clutch-wheel mounted to rotate in unison with said hub, a pair of clutch-shoes bearing pins, guides for said shoes, and a cam-wheel having eccentric slots therein located to engage said pins to operate said shoes, and means for rotating said cam-wheel, substantially as described.

In testimony whereof I have hereunto set my hand in presence of two subscribing witnesses.

CHARLES M. RHODES.

Witnesses:
JOSIAH C. AULT,
HIGH H. BROWN.